(12) United States Patent
Eiane et al.

(10) Patent No.: US 8,373,105 B2
(45) Date of Patent: Feb. 12, 2013

(54) BAFFLES AND METHODS FOR DISTRIBUTED-APERTURE SENSORS

(75) Inventors: Courtney Eiane, Brookline, NH (US); Richard J. Bombard, Brookline, NH (US); Megan B. McDavitt, Manchester, NH (US); Michael J. Choiniere, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 856 days.

(21) Appl. No.: 12/389,075

(22) Filed: Feb. 19, 2009

(65) Prior Publication Data

US 2011/0176214 A1 Jul. 21, 2011

(51) Int. Cl.
*F42B 15/01* (2006.01)
*F41G 7/26* (2006.01)
*F42B 15/00* (2006.01)
*F41G 7/00* (2006.01)

(52) U.S. Cl. .......... 244/3.16; 244/3.1; 244/3.15

(58) Field of Classification Search ........... 244/3.1–3.3; 89/1.11; 250/200, 216, 229, 232, 233; 359/642, 359/726, 727, 728, 738–740; 343/700 R, 343/772, 781 R, 781 CA See application file for complete search history.

(56) References Cited

U.S. PATENT DOCUMENTS

| | | | | |
|---|---|---|---|---|
| 2,961,545 A | * | 11/1960 | Merlen et al. | 244/3.16 |
| 3,780,966 A | * | 12/1973 | Newcomb et al. | 244/3.16 |
| 3,780,967 A | * | 12/1973 | Evers et al. | 244/3.16 |
| 4,282,527 A | * | 8/1981 | Winderman et al. | 343/781 CA |
| H299 H | | 7/1987 | Miller, Jr. | 244/3.13 |
| 4,702,435 A | * | 10/1987 | Montgomery et al. | 244/3.13 |
| 5,214,438 A | * | 5/1993 | Brusgard et al. | 343/781 CA |
| 5,268,680 A | * | 12/1993 | Zantos | 343/781 CA |
| 6,462,889 B1 | * | 10/2002 | Jackson | 359/728 |
| 6,507,392 B1 | | 1/2003 | Richards | |
| 6,690,458 B2 | | 2/2004 | Schorr | |
| 6,943,873 B2 | | 9/2005 | Sallee | |
| 7,276,681 B2 | | 10/2007 | Alexander | |
| 7,786,418 B2 | * | 8/2010 | Taylor et al. | 244/3.16 |

FOREIGN PATENT DOCUMENTS

JP 62-138714 A * 6/1987 .................. 244/3.16

* cited by examiner

*Primary Examiner* — Bernarr Gregory (74) *Attorney, Agent, or Firm* — Fulbright & Jaworski; Mark T. Garrett (57) ABSTRACT

This disclosure includes embodiments of laser-seeking munitions, and methods of constructing laser-seeking munitions. Some embodiments of these munitions comprise a body; one or more sensors; a plurality of lenses coupled to the body and configured to be capable of transmitting light to the one or more sensors. Some embodiments comprise one or more baffles coupled to the plurality of lenses, the one or more baffles configured to substantially block a portion of the plurality of lenses from transmitting light to the one or more sensors. Some embodiments comprise a plurality of optical fibers optically coupled to the sensor(s) and the lense(s), where the fibers are configured to substantially block a portion of each of the plurality of lenses from transmitting light to the one or more sensors.

25 Claims, 6 Drawing Sheets

BAFFLES AND METHODS FOR DISTRIBUTED-APERTURE SENSORS

BACKGROUND OF THE INVENTION

1. Field of the Invention

The present invention relates generally to distributed-aperture sensors, and, more particularly, but not by way of limitation, to baffles and methods for improving distributed-aperture sensors and systems, such as, for example, distributed-aperture seeker sensors.

2. Description of Related Art

A number of sensor systems have been developed and/or are in use in the art. For example, munitions such as missiles, rockets, rocket-propelled grenades, mortars, and others, may be fitted with laser-seeking guidance systems. For example, such a laser-seeking system may include a plurality of distributed apertures coupled to the body of the munition with the apertures configured to receive reflected light from a laser that is used to "paint" a target. The lenses transmit the reflected laser light to one or more sensors such that the laser-guidance system senses or detects the reflected laser light and adjusts the trajectory of the munition to hit the "painted" target from which the laser light is reflected.

The following references may disclose examples of distributed-aperture sensors, and/or may facilitate a more-complete understanding of various embodiments of the present invention, and uses for various embodiments of the present invention: (1) U.S. patent application Ser. No. 11/139,098, filed May 26, 2005 now U. S. Pat. No. 7,276,681, and published as Pub. No. US 2006/0266919; (2) U.S. patent application Ser. No. 11/072,177, filed Mar. 4, 2005 now U. S. Pat. No. 7,575,190, and published as Pub. No. US 2007/0034732; (3) U.S. patent application Ser. No. 11/549,592, filed Oct. 13, 2006 now U. S. Pat. No. 7,530,528, and published as Pub. No. US 2007/0290096; (4) U.S. Pat. No. 6,507,392, filed Apr. 16, 2001; (5) U.S. Pat. No. 6,690,458, filed Nov. 21, 2002; (6) U.S. Pat. No. 6,943,873, filed Jul. 17, 2001; (7) U.S. Pat. No. 7,276,681, filed May 26, 2005; and (8) US Statutory Invention Registration No. H299. The foregoing references numbered (1) through (8) are hereby incorporated by reference in their entireties.

SUMMARY OF THE INVENTION

The present disclosure includes various embodiments of laser-guided munitions, distributed-aperture sensor systems, baffles for distributed-aperture sensor systems, and methods of manufacture.

Some embodiments of the present munitions comprise: a body; one or more sensors; a plurality of lenses coupled to the body and configured to be capable of transmitting light to the one or more sensors; and one or more baffles coupled to the plurality of lenses, the one or more baffles configured to substantially block a portion of the plurality of lenses from transmitting light to the one or more sensors.

In some embodiments, the munition has a field-of-view, and the size of the blocked portion of the plurality of lenses is substantially constant within the field-of-view.

In some embodiments, the one or more baffles are at least one of in front of the plurality of lenses, behind the plurality of lenses, and integral to the plurality of lenses.

In some embodiments, the one or more baffles comprise a plurality of baffles configured to substantially block a portion of each lens from transmitting light to the one or more sensors. In some embodiments, the blocked portion of each lens is a fraction of the lens, and where the sum of the blocked portions of the lenses is an integer multiple of a single lens. In some embodiments, the plurality of lenses consists of four lenses, and where the blocked portion of each lens is about one-fourth of that lens. In some embodiments, the plurality of lenses consists of four lenses, and where the blocked portion of each lens is about one-half of that lens. In some embodiments, the blocked portion of each lens comprises a slice extending radially outward from the center of the that lens. In some embodiments, the blocked portion of each lens extends inward relative to the center of the body. In some embodiments, the blocked portion of each lens comprises the inboard quadrant of that lens. In some embodiments, the blocked portion of each lens extends outward toward the center of the body. In some embodiments, the blocked portion of each lens comprises the outboard quadrant of the lens.

Some embodiments of the present laser-seeking munition comprise: a body; one or more sensors; a plurality of lenses coupled to the body and configured to be capable of transmitting light to the one or more sensors; and a baffle configured to substantially block a portion of each lens from being capable of receiving light having a 0-degree angle-of-incidence.

Some embodiments of the present laser-seeking munitions comprise: a body; one or more sensors; a plurality of optical fibers optically coupled to the one or more sensors; and a plurality of lenses optically coupled to the plurality of optical fibers and configured to be capable of transmitting light to the one or more sensors via the plurality of optical fibers; where the plurality of fibers are configured to substantially block a portion of each of the plurality of lenses from transmitting light to the one or more sensors.

In some embodiments of the present methods of constructing a laser-seeking munition, the laser seeking munition comprising a body, one or more sensors, and a plurality of lenses coupled to the body and configured to be capable of transmitting light to the one or more sensors, and the method comprises: coupling one or more baffles to the plurality of lenses such that the one or more baffles are configured to substantially block a portion of the plurality of lenses from transmitting light to the one or more sensors.

Any embodiment of any of the present methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DESCRIPTION OF ILLUSTRATIVE EMBODIMENTS

The term "coupled" is defined as connected, although not necessarily directly, and not necessarily mechanically; two items that are "coupled" may be integral with each other. The terms "a" and "an" are defined as one or more unless this disclosure explicitly requires otherwise. The terms "substantially," "approximately," and "about" are defined as largely but not necessarily wholly what is specified, as understood by a person of ordinary skill in the art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those elements. Likewise, a method that "comprises," "has," "includes" or "contains" one or more steps possesses those one or more steps, but is not limited to possessing only those one or more steps. For example, in a method that comprises coupling a plurality of baffles to one or more lenses, the method includes the specified step but is not limited to having only that step. For example, such a method could also include coupling the plurality of lenses to a munition.

Further, a device or structure that is configured in a certain way is configured in at least that way, but it can also be configured in other ways than those specifically described.

Figure 1:
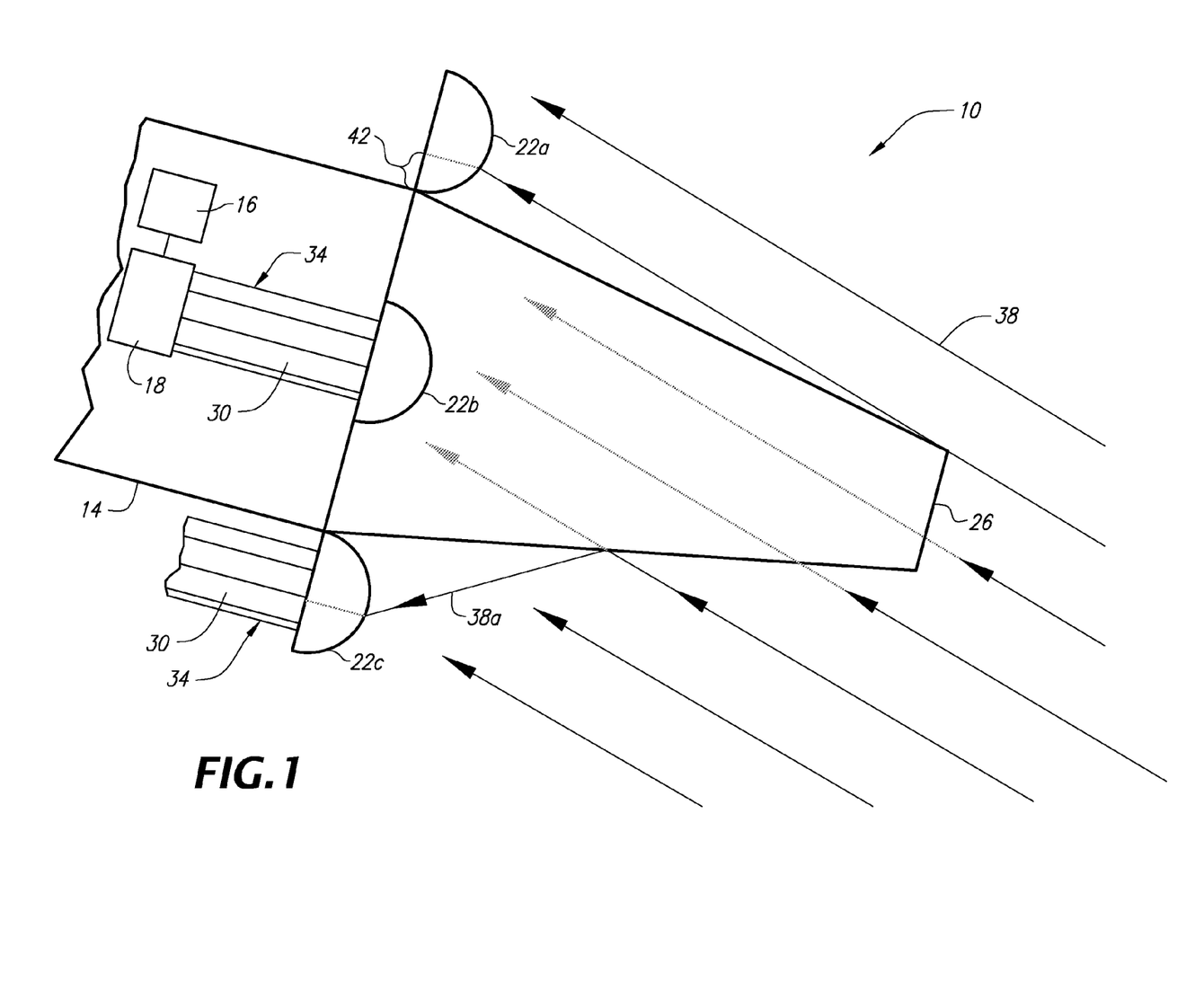
FIG. 1 depicts side view of a portion of one exemplary embodiment of a laser-guided munition comprising a plurality of lenses.
Figure 2:
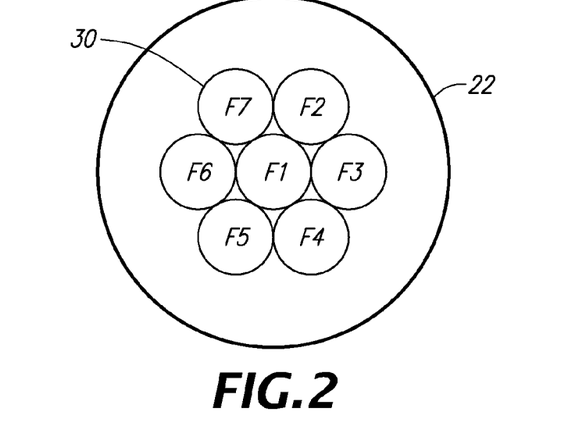
FIG. 2 depicts an enlarged front view of a single lens of the laser-guided munition of FIG. 1.
Figure 3:
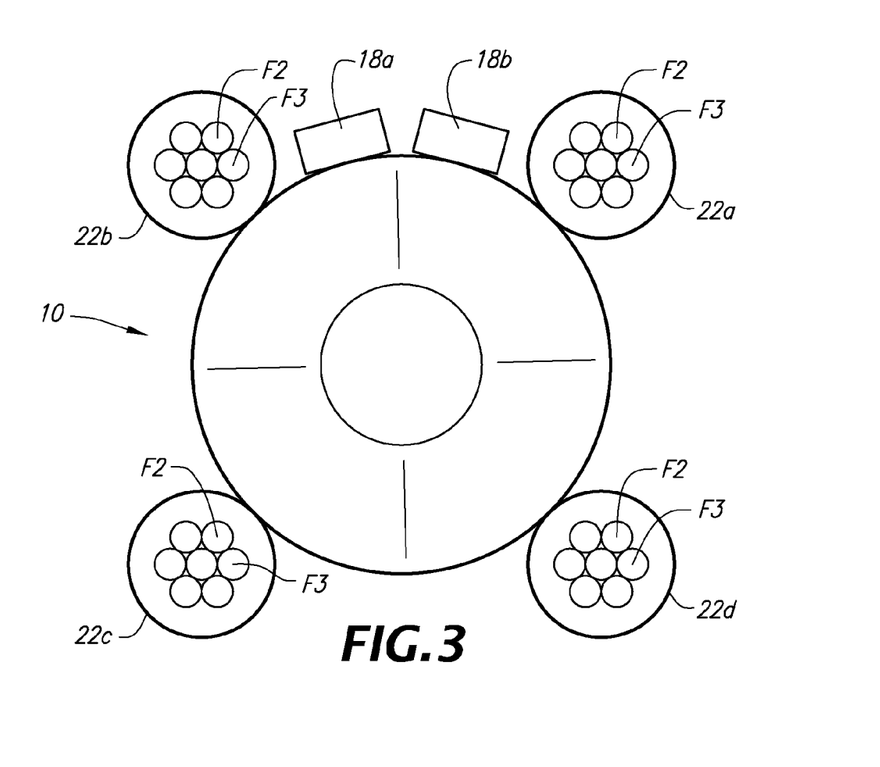
FIG. 3 depicts a front view of the laser-guided munition of FIG. 1.

Referring now to the drawings, and more particularly to FIGS. 1 and 2, shown therein and designated by the reference numeral 10 is an exemplary guided munition, which may, for example, be a laser-seeking guided munition. Guided munition 10 may be interchangeably referred to herein as munition 10 or laser-seeking munition 10. Munition 10 can be any suitable munition, such as, for example, a Precision Guided Mortar Munition (PGMM), an Advanced Precision Kill Weapon System (APKWS), or the like. Munition 10, as shown, comprises a body 14, a controller 16, one or more sensors 18, and a plurality of lenses (or apertures) 22a, 22b, 22c, 22d. Body 14 includes a nose 26. The body and the nose are merely illustrative of one possible configuration, and are not intended to depict a specific munition or to be limiting in any way. Controller 16 is coupled to the one or more sensors, and is configured to receive and process data from the one or more sensors and adjust the trajectory of the munition accordingly. The controller can comprise any suitable devices and/or systems, such as, for example, one or more processors, field processor gate arrays (FPGAs), memory, and/or the like.

In the embodiment shown, lenses 22a, 22b, 22c, 22d are hemispherical. In other embodiments, the lenses can be any suitable shape, such as, for example, spherical, flat, arcuate, or the like. Similarly, the lenses need not be shaped or configured to bend or otherwise modify the characteristics of light when light passes through (is transmitted by) the lenses. Each lens is optically coupled to at least one of the one or more sensors by one or more optic fibers 30. In the embodiment shown, optic fibers 30 are arranged in bundles 34, with each bundle 34 having seven optic fibers 30 (for clarity of illustration, the fibers for lens 22a are omitted). Each bundle is similarly positioned relative to its respective lens. As best shown in FIG. 2, which depicts a single sensor 22, the seven fibers for the depicted embodiment include a fiber in a central position F1, and six fibers positioned around the central fiber at positions F2-F6. In other embodiments, bundles 34 can have any suitable number of optic fibers, such as, for example, three, four, five, six, eight, nine, ten, or more. For clarity of illustration, only one sensor 18 is shown connected to only one lens 22 by a single bundle 34 of fibers 30. However, in some embodiments of the present munitions, systems, and/or methods, any suitable combination of lenses and one or more sensors can be used. For example, all of the lenses can be connected to a single sensor; each lens can be connected to a different sensor by a different bundle of optical fibers; or a corresponding fiber from each lens can be connected to a different sensor, or can be configured with any other suitable combination of lenses, fibers, and/or sensors.

In some embodiments, the munition comprises a plurality of sensors, and correspondingly-positioned fibers from each of the four lenses are connected to common sensors. For example, a fiber in position F1 from first lens 22a, a fiber in position F1 from second lens 22b, a fiber in position F1 from third lens 22c, and a fiber in position F1 from fourth lens 22d can all be optically coupled to a common first sensor 18a. Similarly, a fiber in position F2 from first lens 22a, a fiber in position F2 from second lens 22b, a fiber in position F2 from third lens 22c, and a fiber in position F2 from fourth lens 22d can all be optically coupled to a common second sensor 18b. The remaining fibers for each corresponding position on the plurality of lenses can be similarly coupled optically to separate sensors. In the embodiment shown, this configuration would have seven sensors because there are seven fibers optically coupled to each lens. In this way, the sensors can detect the laser light incident at each fiber position of each lens and effectively average or normalize the intensity of the light at each sensor position. For example, fibers 30a, 30b, 30c, and 30d are in corresponding positions relative to each of their respective lenses 22a, 22b, 22c, and 22d. As such, when the intensity of light is detected for all four, the intensity for that fiber position can be normalized at that fiber position for all four lenses. In this way, the relative intensities at all seven fiber positions (for all four lenses) can be used to determine the angle-of-incidence of the laser light, such that the trajectory of the munition can be changed, and the "painted" target more-accurately approached by the munition.

The munition is shown with laser light 38 reflected from a "painted" target, such that the laser light is incident upon lenses 22. In some embodiments, the munition can be described as having a field-of-view that includes a range of angles-of-incidence for light that the lenses are capable of receiving and/or transmitting to the one or more sensors. For laser light incident at the angle shown (relative to the longitudinal axis of the munition), the geometry of the nose can cause a shadowed portion 42 on lens 22a (lens 22a is on the "dark" side of the nose"). The nose effectively prevents the laser light from reaching the shadowed portion, such that laser light is not detected within shadowed portion 42. As such, when fibers 30 at positions within the shadowed portion are normalized with the corresponding fiber positions from the other three lenses, the intensity detected at the shadowed fiber positions may be misleadingly low (laser light that would have otherwise been incident at the shadowed portion will be blocked by the nose, altering the detected intensity such that the trajectory may be over- or under-corrected).

Similarly, in some embodiments, some portion of laser light 38a, such as on the opposite side of the nose, can be reflected from the nose onto lens 22c. This reflected laser light 38a can result in a higher intensity being detected by the fibers that are optically coupled to lens 22c. As such, when the fibers coupled to lens 22c in positions that receive additional laser light (reflected from the nose) are normalized with the corresponding fiber positions from the other three lenses, the intensity detected at these fiber positions may be misleadingly high (laser light 38a that would not have otherwise reached these fiber positions will be reflected by the nose, altering the detected intensity such that the trajectory may be over- or under-corrected).

For example, in the embodiment shown when, laser light is incident at a 0-degree angle-of-incidence (AOI), the full area of all four lenses will be capable of detecting the incident laser light. However, if the field-of-view of the munition is large enough, as the angle-of-incidence of the laser light increases, the size of shadowed portion 42 will also increase until lens 22a is entirely shadowed and only three of the four lenses are capable of detecting the incident laser light. In this way, the shadow will vary with the angle-of-incidence of the light such that the lens area detecting light will vary between that of three lenses and four lenses, and can cause variations in the detected intensity that can adversely affect the guidance of the munition (e.g., by introducing false peaks). In similar fashion, in other embodiments of the munition, portions of two lenses could be simultaneously shadowed.

In some of the present embodiments, one or more baffles are provided to compensate for the shadowing by blocking a portion of the lenses (that includes the portion that would, or may, be shadowed by the nose) from transmitting light to the one or more sensors. By adding the one or more baffles, the blocked portion can be controlled such that it is predictable and/or constant, and such that variations (e.g., caused by the shadow of the nose) are removed. In some embodiments, the one or more baffles are configured such that, within the field-of-view of the munition, the area of the lenses capable of detecting laser light remains effectively constant. For example, in the embodiments shown in FIGS. 6-10, the baffles can effectively eliminate the variations in area between three and four lenses across the field-of-view of the munition, such that, for example, across the field-of-view of the munition, a substantially constant area equal to the area of three lenses is capable of receiving and transmitting light to the one or more sensors.

For example, for a munition comprising four lenses, and one or more sensors, where each lens has an area; and each lens is coupled to one or more of the four lenses; the munition could comprise one or more baffles, and could be configured such that within the field-of-view of the munition, a portion of the lenses equal to the area of one lens is blocked from transmitting incident light to the one or more sensors. In this way, within the field of view, three-fourths of the total area of the four lenses (not necessarily only three lenses out of the four) remains capable of transmitting incident light to the one or more sensors across the field-of-view of the munition. Similarly, the munition could be configured such that within the field-of-view of the munition, a portion of the lenses equal to the area of two lenses is blocked from transmitting incident light to the one or more sensors.

"Blocked from transmitting incident light to the one or more sensors" does not require that if light is incident on the munition, it is permitted to reach a lens. For example, a portion of the one or more lenses can be "blocked from transmitting incident light to the one or more sensors" with a baffle in front of one or more of the lenses, such that if light is incident on the munition, the incident light is blocked from reaching the blocked portion of the one or more lenses, and the blocked portion of the one or more lenses is thereby blocked from transmitting incident light to the one or more sensors.

Some embodiments of the present munitions comprise a body, one or more sensors, a plurality of lenses coupled to the body and configured to be capable of transmitting light to the one or more sensors, and a plurality of baffles configured to substantially block a portion of each lens from transmitting light. As shown, the lenses do not necessarily transmit light directly to the one or more sensors. Instead, the lenses may transmit laser light to the one or more sensors via one or more optical fibers, and/or any other suitable conduit. In other embodiments, the lenses can transmit light directly to the one or more sensors, and/or can be optically coupled to the one or more sensors in any other suitable fashion, such as, for example, by way of mirrors or any other configuration.

Figure 4:
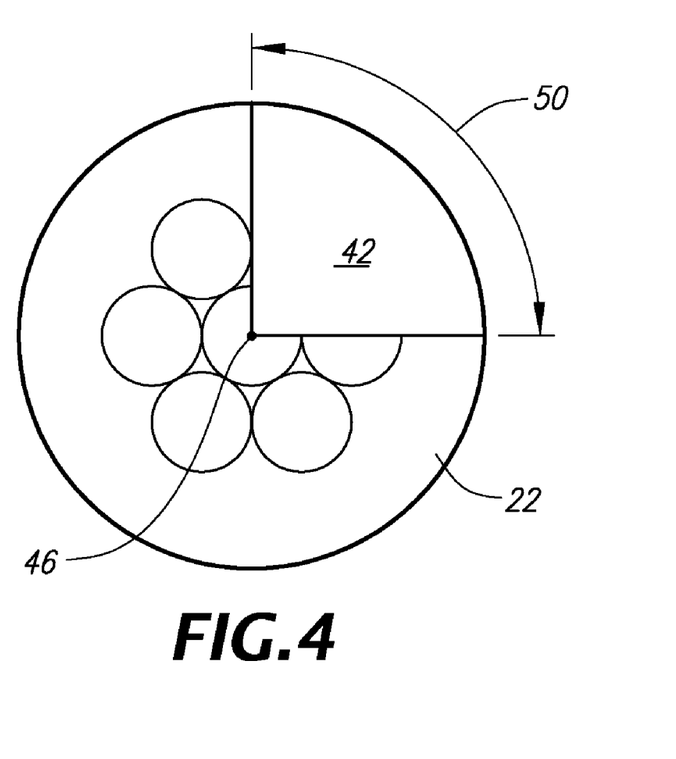
FIG. 4 depicts an enlarged front view of a lens shown with one exemplary embodiment of the present baffles.

FIG. 4 depicts one exemplary embodiment of a baffle 42 configured to block a portion (blocked portion) of the lens 22 from transmitting light to the one or more sensors. As shown, the baffle and the blocked portion of the lens is a slice extending radially outward from the center 46 of the lens. In such an embodiment, the baffle can also be described as having an angular sweep 50. As shown, angular sweep 50 is 90 degrees. In other embodiments, the angular sweep can be any suitable size, such as, for example, at least, equal to, greater than, or within a range between, about any of: 10, 20, 30, 40, 45, 50, 60, 70, 80, 90, 100, 110, 120, 130, 135, 140, 150, 160, 170, and 180 degrees, or more. In the embodiment shown, the blocked portion can also be described as a fraction of the lens, and more-specifically, one-fourth of the lens. In other embodiments, the blocked portion can be any suitable fraction of the lens, such as, for example, one-half, one-third, one-quarter, one-fifth, one-sixth, one-eighth, or the like.

In the embodiment shown, the baffle is opaque such that the blocked portion of the lens is blocked from transmitting substantially any light. In other embodiments, the baffle can be translucent, such that the blocked portion of the lens is only partially blocked and is still capable of transmitting some light.

Figure 5:
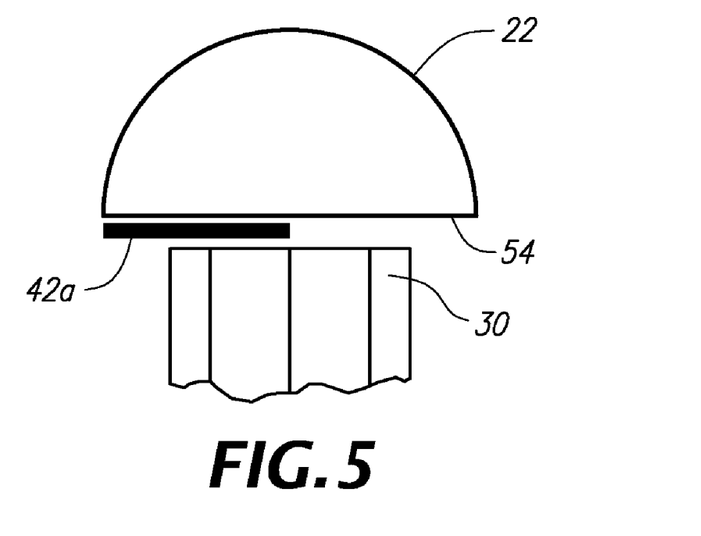
FIG. 5 depicts an enlarged side view of one exemplary embodiment of a lens with a baffle.

The baffle can be formed, constructed, or otherwise configured in any suitable fashion. For example, as shown in FIG. 5, some embodiments of a baffle 42a can be configured as a layer adjacent or on a rear surface 54 of the lens, such that the baffle is disposed between the lens and the optical fibers, and/or coupled to at least one of the lens and the optical fibers. In such embodiments, light may be permitted to pass through the blocked portion of the lens, but is prevented from being transmitted to the one or more sensors.

In other embodiments (not shown) the baffle can be integral to the lens, such that within the blocked portion of the lens, the lens itself includes an opaque or translucent baffle layer, or such that the blocked portion of the lens is entirely opaque or translucent. In such embodiments, the baffle may be configured by impregnating the lens with a material, composition, dye, or the like that causes the blocked portion to be opaque or translucent.

Figure 6:
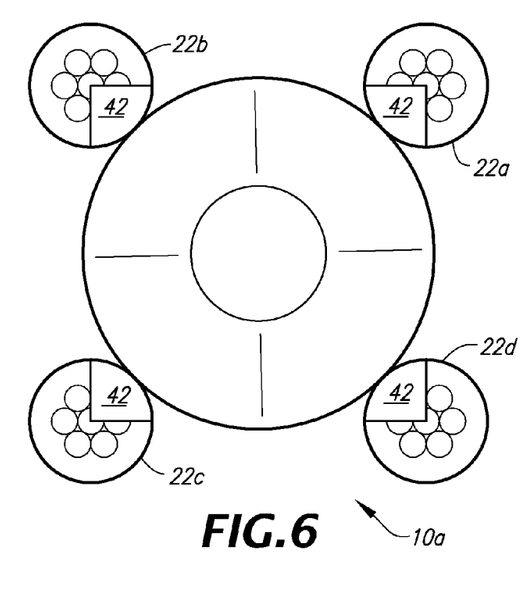
FIG. 6 depicts a front view of an exemplary embodiment of a laser-guided munition comprising a plurality of lenses and a plurality of baffles.

Referring now to FIG. 6, a front view of a munition 10*a* is shown comprising a plurality of baffles 42*a*, 42*b*, 42*c*, 42*d* configured to substantially block a portion of each lens 22*a*, 22*b*, 22*c*, 22*d* from transmitting light. In the embodiment shown, the lenses are substantially equal in size. Additionally, in the embodiment shown, the blocked portion of each lens is a fraction of the lens (one-fourth of each lens). In this way, the sum of the blocked portions of the lenses is an integer multiple of a single lens. That is, with four lenses and about or exactly one-fourth of each lens blocked, the sum of the blocked portions is equal to one full lens (one-fourth multiplied by four). In other embodiments, if the blocked portion of each lens is about or equal to one-half of the lens, then the sum of the blocked portions would be about or equal to two lenses. Stated otherwise, the blocked portion of each lens is a fraction of the lens that is inversely proportional to the number of lenses. That is, with four lenses, the blocked portion of each lens is a fraction of the lens equal to one-fourth. Similarly, for example, with five lenses, the blocked portion of each lenses could be about or equal to one-fifth of the lens.

In the embodiment shown in FIG. 6, the blocked portion of each lens is also an inboard quadrant. Specifically, the blocked portion of each lens is a quadrant (slice with a 90-degree angular sweep) extending inward from the center 46 of the lens toward the body of munition 10*a*. In some embodiments, the inboard quadrant is centered about an axis extending through both the center of the lens and the center of the body.

Figure 7:
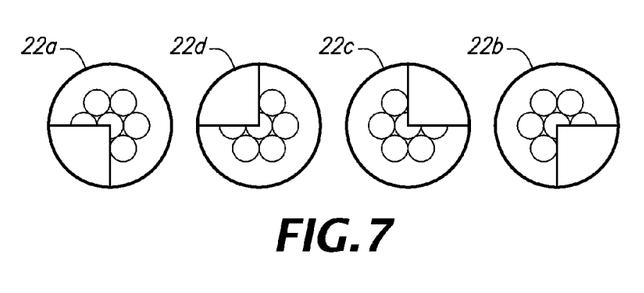
FIG. 7 depicts a front view of the plurality of lenses of the laser-guided munition of FIG. 6.

As illustrated in FIG. 7, in such embodiments, the baffles are configured such that the blocked portions of the lenses do not overlap one another. In this way, when the light intensities detected from the optical fibers corresponding to each sensor are normalized (or summed), a different portion of each lens is blocked and the normalized light intensity from all of the plurality of sensors will be representative of three complete sensors.

Figure 8:
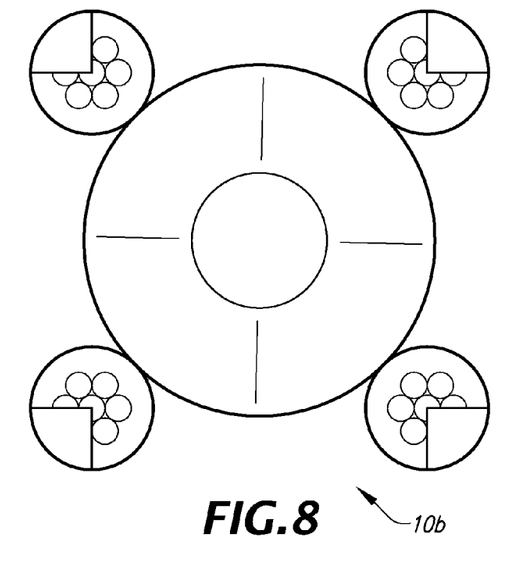
FIG. 8 depicts a front view of another exemplary embodiment of a laser-guided munition comprising a plurality of lenses and a plurality of baffles.

Referring now to FIG. 8, the blocked portion of each lens is an outboard quadrant. That is, the baffles (and the blocked portions) extend outward relative to the body; each blocked portion is a slice extending outward from the center 46 of the lens, and outward relative to the body (away from the body). In other embodiments, each baffle and corresponding blocked portion can extend outward relative to the body and can comprise any suitable portion or fraction of the respective lens. In some embodiments, the outboard quadrant is centered about an axis extending through both the center of the lens and the center of the body. For example, for an outboard quadrant having an angular sweep of 90 degrees, 45 degrees of the angular sweep is disposed on one side of the axis (extending through both the center of the lens and the center of the body) and 45 degrees of the angular sweep is disposed on the other side of the axis (extending through both the center of the lens and the center of the body).

In other embodiments (not shown), the blocked portion of each lens can comprise any suitable portion or portions of the lens. For example, in some embodiments, each baffle (and blocked portion) can comprise both an inboard quadrant and an outboard quadrant of its respective lens.

In some embodiments, the baffle can be configured in any other suitable fashion. For example, in a laser-seeking munition comprising a body; one or more sensors; a plurality of optical fibers optically coupled to the one or more sensors; and a plurality of lenses optically coupled to the plurality of optical fibers and configured to be capable of transmitting light to the one or more sensors via the plurality of optical fibers; the plurality of optical fibers can be configured to substantially block a portion of each of the plurality of lenses from transmitting light to the one or more sensors. Stated another way, a portion of each lens can be blocked from transmitting light to the one or more sensors by omitting optical fibers within the blocked portion, thereby blocking the lens from transmitting light to the one or more sensors for that blocked portion.

Figure 9:
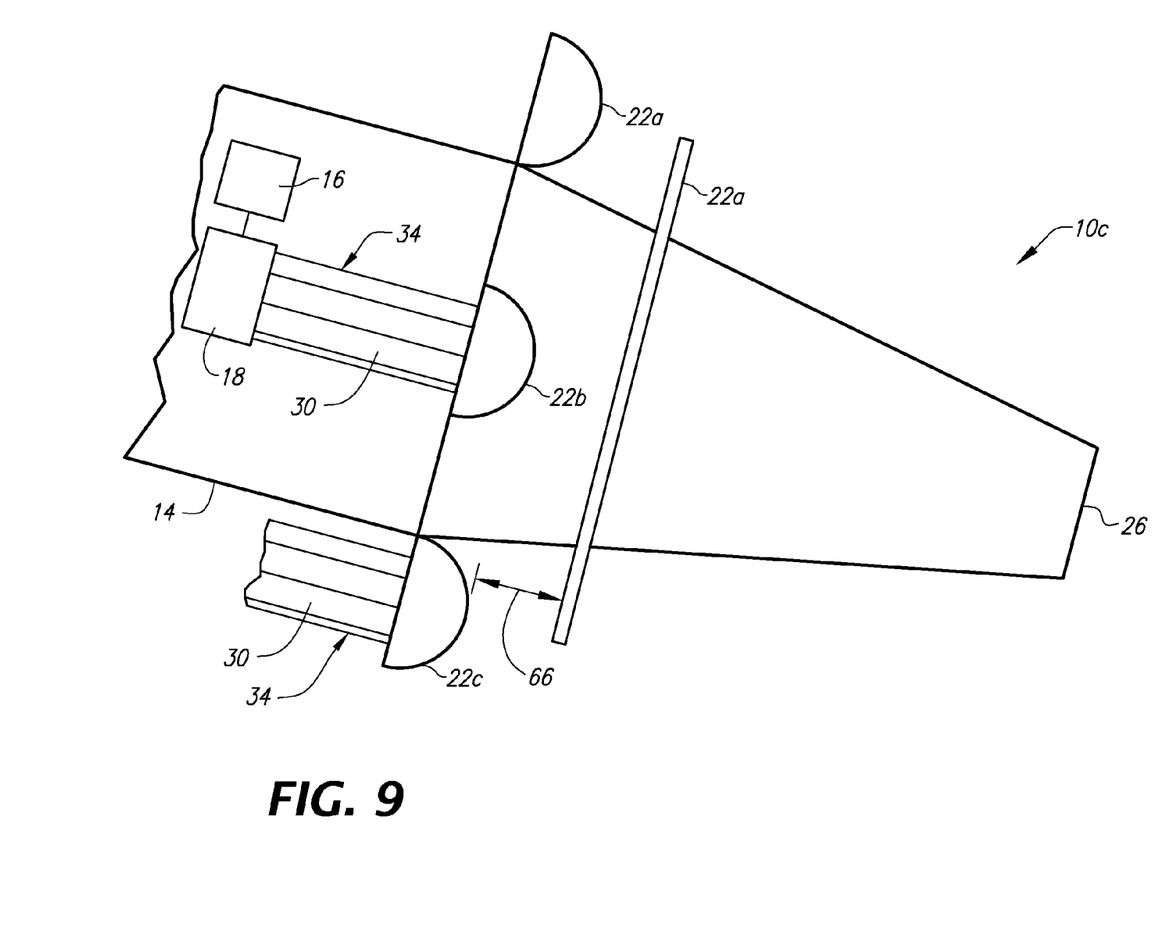
FIG. 9 depicts a side view of another exemplary embodiment of a laser-guided munition comprising a plurality of lenses and a baffle.
Figure 10:
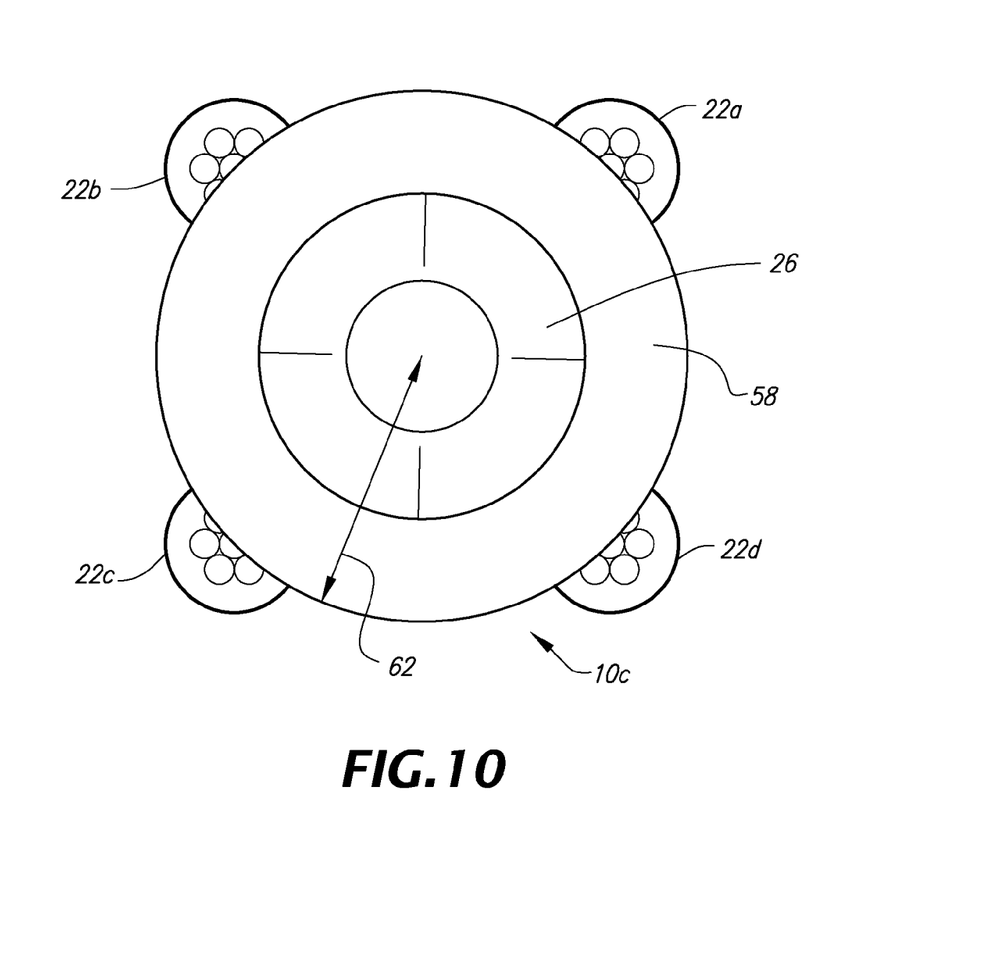
FIG. 10 depicts a front view of the laser-guided munition of FIG. 9.

Referring now to FIGS. 9 and 10, a second embodiment of a laser-guided munition 10*c* is shown having a plurality of lenses 22*a*, 22*b*, 22*c*, 22*d*, and a baffle 58 coupled to the plurality of lenses (e.g., indirectly, such as by virtue of the fact that the baffle and the sensors are both directly or indirectly coupled to the body). In the embodiment shown, baffle 58 comprises a ring disposed about nose 26. The baffle 58 has radius 62 extending from the center of the baffle (and the center of the nose) to the perimeter of the baffle. Radius 62 can be any suitable size. For example, in some embodiments, the radius is sized such that when looking directly at the nose (as in FIG. 10), the baffle covers one-half of each lens 22*a*, 22*b*, 22*c*, 22*d*. In this way, the sum of the non-blocked portions of the lenses is equal to twice the area of two lenses. In other embodiments, the radius is sized such that when looking directly at the nose, the baffle covers one-quarter of each lens 22*a*, 22*b*, 22*c*, 22*d*.

The baffle is also disposed a distance 66 from the lenses such that across a selected range of angles-of-incidence for incident light (e.g., within 20 degrees from the longitudinal axis of the munition in any direction), the sum of the blocked portion of each lens is an integer multiple of the total area of a single lens. For example, in the embodiment shown with one-half of each lens blocked for a 0-degree angle-of-incidence (as in FIG. 10), the distance 66 can be such that the sum of the non-blocked portions of the lenses remains equal to twice the area of two lenses for any angle-of-incidence that is less than 20 degrees. These principles can be applied to adjust radius 62 and distance 66 for a variety of munitions and lens geometries. For example, radius 62 and distance 66 can be adjusted to block one-quarter of each lens for a 0-degree angle-of-incidence. In other embodiments, distance 66 can be configured to function as described for incident light having angles of incidence in a range up to any suitable angle-of-incidence, including, for example, 10 degrees, 15 degrees, 20 degrees, 25 degrees, 30 degrees, 35 degrees, 40 degrees, 45 degrees, 50 degrees, 55 degrees, or 60 degrees.

Some embodiments of the present systems can comprise a plurality of lenses, and a plurality of baffles configured to substantially block a portion of each lens from transmitting light. Some embodiments of the present systems can comprise one or more sensors, a plurality of lenses configured to be capable of transmitting light to the one or more sensors; and a plurality of baffles configured to substantially block a portion of each lens from transmitting light.

Some embodiments of the present methods can comprise coupling a baffle to a lens that is coupled to the body of a munition comprising one or more sensors, where the lens is configured to be capable of transmitting light to the one or more sensors, and where the baffle is coupled to the lens such that the baffle substantially blocks a portion of each lens from transmitting light to the one or more sensors. In such embodiments, the baffle can be configured or coupled to the lens in any suitable fashion, including, but not limited to the examples described above.

In any of the various embodiments described or suggested in this disclosure, the devices, systems, and methods can comprise or be limited to any combination of the elements, characteristics, steps, and/or features described, unless the context explicitly or necessarily precludes the combination. For example, some embodiments can comprise a plurality of lenses and a plurality of baffles, such that the lenses and baffles can be retrofitted to various laser-guided munitions having one or more sensors.

The various illustrative embodiments of devices, systems, and methods described herein are not intended to be limited to the particular forms disclosed. Rather, they include all modifications, equivalents, and alternatives falling within the scope of the claims. For example, in embodiments, such as the ones depicted above, each lens may be larger than the corresponding optical fiber bundle (or other conduit) such that a baffle that is smaller than one-fourth of the lens that still blocks one-fourth of the corresponding fiber bundle would still effectively block one fourth of the lens from transmitting light to the one or more sensors.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. A laser-seeking munition comprising:
   a body;
   one or more sensors;
   a plurality of lenses coupled to the body and configured to be capable of transmitting light to the one or more sensors; and
   one or more baffles coupled to the plurality of lenses, the one or more baffles configured to substantially block a portion of the plurality of lenses from transmitting light to the one or more sensors.

2. The laser-seeking munition of claim 1, where the munition has a field-of-view, and the size of the blocked portion of the plurality of lenses is substantially constant within the field-of-view.

3. The laser-seeking munition of claim 1, where the one or more baffles are at least one of in front of the plurality of lenses, behind the plurality of lenses, and integral to the plurality of lenses.

4. The laser-seeking munition of claim 1, where the one or more baffles comprise a plurality of baffles configured to substantially block a portion of each lens from transmitting light to the one or more sensors.

5. The laser-seeking munition of claim 4, where the blocked portion of each lens is a fraction of the lens, and where the sum of the blocked portions of the lenses is an integer multiple of a single lens.

6. The laser-seeking munition of claim 5, where the plurality of lenses consists of four lenses, and where the blocked portion of each lens is about one-fourth of that lens.

7. The laser-seeking munition of claim 6, where the plurality of lenses consists of four lenses, and where the blocked portion of each lens is about one-half of that lens.

8. The laser-seeking munition of claim 4, where the blocked portion of each lens comprises a slice extending radially outward from the center of the that lens.

9. The laser-seeking munition of claim 8, where the blocked portion of each lens extends outward relative to the center of the body.

10. The laser-seeking munition of claim 9, where the blocked portion of each lens comprises the inboard quadrant of that lens.

11. The laser-seeking munition of claim 8, where the blocked portion of each lens extends inward toward the center of the body.

12. The laser-seeking munition of claim 11, where the blocked portion of each lens comprises the outboard quadrant of the lens.

13. A method of constructing a laser-seeking munition, the laser seeking munition comprising a body, one or more sensors, and a plurality of lenses coupled to the body and configured to be capable of transmitting light to the one or more sensors, the method comprising:
   coupling one or more baffles to the plurality of lenses such that the one or more baffles are configured to substantially block a portion of the plurality of lenses from transmitting light to the one or more sensors.

14. The method of claim 13, where the munition has a field-of-view, and the size of the blocked portion of the plurality of lenses is substantially constant within the field-of-view.

15. The method of claim 13, where the one or more baffles are at least one of: in front of the plurality of lenses, behind the plurality of lenses, and integral to the plurality of lenses.

16. The method of claim 13, where the one or more baffles comprise a plurality of baffles configured to substantially block a portion of each lens from transmitting light to the one or more sensors.

17. The method of claim 16, where the blocked portion of each lens is a fraction of the lens, and where the sum of the blocked portions of the lenses is an integer multiple of a single lens.

18. The method of claim 17, where the plurality of lenses consists of four lenses, and where the blocked portion of each lens is about one-fourth of that lens.

19. The method of claim 18, where the plurality of lenses consists of four lenses, and where the blocked portion of each lens is about one-half of that lens.

20. The method of claim 17, where the blocked portion of each lens comprises a slice extending radially outward from the center of the that lens.

21. The method of claim 20, where the blocked portion of each lens also extends outward relative to the center of the body.

22. The method of claim 21, where the blocked portion of each lens comprises the outboard quadrant of that lens.

23. The method of claim 22, where the blocked portion of each lens also extends inward toward the center of the body.

24. The method of claim 23, where the blocked portion of each lens comprises the inboard quadrant of the lens.

25. A laser-seeking munition comprising:
   a body;
   one or more sensors;
   a plurality of optical fibers optically coupled to the one or more sensors;
   a plurality of lenses optically coupled to the plurality of optical fibers and configured to be capable of transmitting light to the one or more sensors via the plurality of optical fibers; and
   where the plurality of optical fibers are configured to substantially block a portion of each of the plurality of lenses from transmitting light to the one or more sensors.

* * * * *